United States Patent Office 3,535,542
Patented Oct. 20, 1970

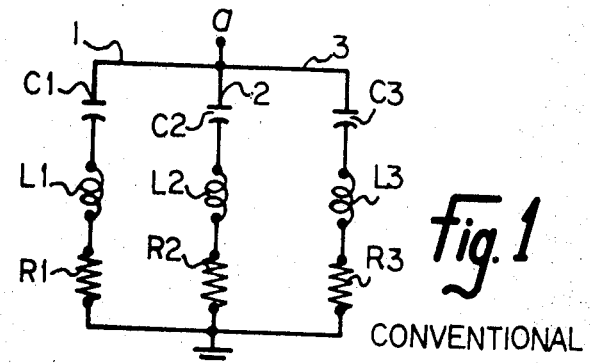
Fig. 1
CONVENTIONAL
INVENTOR
Tobias GILSIG
BY Pierre Lesperance
AGENT

3,535,542
INTERCONNECTED HARMONIC FILTERS FOR ELECTRIC POWER LINES
Tobias Gilsig, Mount Royal, Montreal, Quebec, Canada, assignor to Hydro-Quebec, West Montreal, Quebec, Canada
Filed Feb. 20, 1969, Ser. No. 801,121
Int. Cl. H02m 1/10
U.S. Cl. 307—105     13 Claims

ABSTRACT OF THE DISCLOSURE

A harmonic filter for a multi-phase electric power line comprising, connected to each phase of the line, a bank of filter branches tuned respectively to each of the harmonics to be attenuated, said tuned filter branches being interconnected to as many common terminals and associated resistors as there are phases such that a different filter branch from each phase is connected to each of the resistors, so as to reduce power losses and to obtain decoupling between the phases at the harmonic frequencies.

---

The present invention relates to a multi-phase harmonic filter and, more particularly, to an interconnected three-phase harmonic filter suitable for high power application.

There is known a three-phase harmonic filter wherein each of the filter branches for each phase in connected to a grounded terminal. This filter, hereinafter called the conventional filter, uses one resistor in each filter branch and there is no interconnection between different filter branches of different phases.

It is an object of the invention to provide a multiphase harmonic filter wherein the filter branches of different phases are interconnected in order to significantly reduce power losses therein, thus resulting in substantial savings.

It is another object of the invention to provide a multiphase harmonic filter wherein filter branches tuned to different characteristic harmonics, are interconnected between the phases respectively and common terminals for the purpose of decoupling the phases.

It is another object of the invention to provide an interconnected harmonic filter which can be adapted to attenuate any desired number of harmonics in each phase of a multi-phase system.

It is another object of the invention to provide an interconnected harmonic filter of the character described, used in association with a three-phase electric line.

In accordance with the invention, an interconnected harmonic filter is provided, comprising one bank of tuned filter branches provided for each of the phases, the filter branches of each bank being tuned to the same group of different harmonics, and as many resistors as there are phases, each connected intermediate a common star-point, which may be the ground, and differently tuned filter branches of different banks. Preferably, the number of filter branches per bank is at least equal to the number of banks and each resistor is connected to filter branches of each of the banks, such that there is connected to each resistor one tuned filter branch for every harmonic of said group of different harmonics, including one or more filter branches from each band of tuned filter branches.

The invention will be described in greater detail by reference to the accompanying drawings, wherein:

FIG. 1 is a circuit diagram of a conventional series-resonant filter for one phase;

Harmonic filters have application wherever harmonic currents are to be attenuated in a multi-phase A.C. system. One possible application of the interconnected filter is the A.C. terminals of a rectifier or inverter of a high voltage D.C. transmission line.

Rectifiers and inverters generate A.C. harmonic currents of characteristic orders, which depend on the converter configurations. For converters built up of one or more three-phase full wave bridges commonly used in high voltage D.C. transmission, these characteristic orders are $KP \pm 1$, where K is any integer and P is the pulse number of the converter. Conventional series-resonant filters are commonly connected to the A.C. terminals of the converter, as shown in FIG. 1, in order to supply a shunt path for these harmonic currents. Three tuned filter branches are shown for phase $a$, the three phases being identical. For a practical 6-pulse installation, these branches might correspond to the 5th, 7th, and 11th harmonics, while for a 12-pulse installation, 11th, 13th, and 23rd harmonic branches would be appropriate. Additional series filters and/or bandpass filters are often added, if higher harmonics must also be attenuated.

Referring now to FIG. 1, the conventional filter comprises three filter branches 1, 2, and 3 connected in parallel between one phase, in this instance phase $a$, and ground. The filter branch 1 consists of a capacitor C1, and inductor L1 and a resistor R1. Similarly, filter branch 2 consists of a capacitor C2, an inductor L2 and a resistor R2 and filter branch 3 consists of a capacitor C3, an inductor L3 and a resistor R3.

As can be realized, the components of each filter branch are identified by a numerical subscript representing the particular filter branch concerned. Each filter branch is tuned to a different harmonic in order to substantially shunt the corresponding harmonic current to ground. For instance, filter branch 1 could be tuned to the 5th harmonic to attenuate the same in phase $a$, and, similarly, filter branch 2 could be tuned to the 7th harmonic and filter branch 3 to the 11th harmonic. In such a conventional harmonic filter, the losses at the harmonic frequency for each filter branch must be high enough to maintain low harmonic impedance for moderate detuning. Consequently, significant power loss is also incurred at the fundamental frequency in the resistors, which are generally included in each filter branch to supplement the resistance of the inductors.

Figure 2:
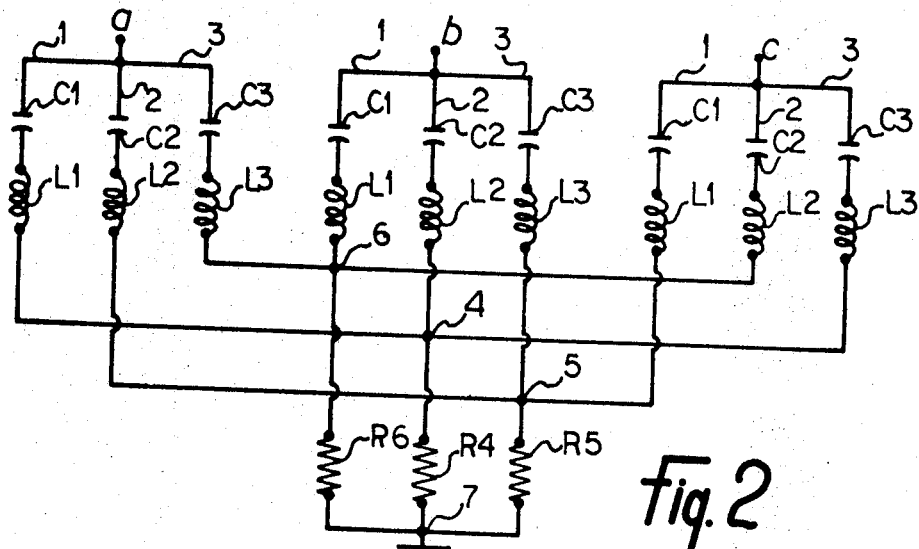
FIG. 2 is a circuit diagram of a three-phase interconnected filter adapted for the attenuation of three harmonics.

Referring now to FIG. 2, there is shown a first embodiment of an interconnected harmonic filter wherein attenuation is provided for three harmonics in each phase of a three-phase transmission line. As for the conventional filter shown in FIG. 1, there is in each phase one filter branch for each harmonic current to be attenuated. One filter branch 1, consisting of a capacitor C1 and an inductor L1 tuned to one harmonic, is provided for each phase a, b, and c. Similarly, corresponding filter branches 2 and 3 are provided such that there is one filter branch 1, one filter branch 2 and one filter branch 3 for each phase a, b, and c. Therefore, each filter branch being tuned to attenuate a different harmonic, the same three harmonics will be attenuated in each phase. Three different filter branches, one for each phase, are interconnected to a common terminal.

By different filter branches or by differently tuned filter branches are meant filter branches tuned to attenuate different harmonic currents. For example, filter branches 1, 2, and 3 of phases a, b, and c respectively are connected to a common terminal 4; filter branches 2, 3, and 1 of phases a, b, and c respectively are connected to a common terminal 5; and filter branches 3, 1, and 2 are connected to a common terminal 6.

As many resistors as there are phases are connected intermediate the respective common terminals and a star-point common to all of the resistors. The star-point can be grounded or ungrounded; in the first case, it can be the ground. In the example of FIG. 2, resistors R4, R5 and R6 are connected intermediate the respective common terminals 4, 5, and 6 and a common star-point 7, which is grounded. In the three-phase interconnected filter of FIG. 2, only three resistors R4, R5, and R6 are in principle sufficient, instead of nine as for the conventional harmonic filter. Each resistor is a common terminal for branches tuned respectively to each of the different harmonics to be attenuated and these branches are connected to different phases.

As is well known in the art, when three currents of different phases are combined at one point, the output current is the sum of the three currents at each particular instant. Thus, when the filter branches are so interconnected to the common terminal, the fundamental frequency currents at the common terminal, being mutually displaced by very nearly 120 electrical degrees, tend to cancel one another.

The interconnection of filter branches tuned to different harmonics is done for the purpose of decoupling the phases at the characteristic harmonics to which are tuned these filter branches.

If $C1=C2=C3$, then the sum of the fundamental currents in the resistors R4, R5, and R6 is nearly zero, substantially limiting the fundamental frequency losses to those inherent in the inductors and capacitors. It is to be noted that the possible reduction in the total number of resistors from nine to three, can result in a lower capital cost for the filter. An analysis of the circuits of FIGS. 1 and 2 shows that if $R1=R2=R3=R4=R5=R6$, then the interconnected harmonic filter has substantially the same filtering efficiency as does the conventional filter, since inter-phase coupling at the harmonic frequencies is low for practical filter parameters. Alternatively, if $$R1 \neq R2 \neq R3$$

and $R4=R5=R6=R$, and if the individual branches of the interconnected filter have resistances $r1$, $r2$, $r3$ such that $r1+R=R1$, $r2+R=R2$ and $r3+R=R3$, the filtering efficiency is then substantially as good as for the above case, while cancellation of fundamental currents in the resistors R4, R5, and R6 results in lower fundamental losses in this portion of the filter resistances.

If the number of filter branches per phase is two, then only partial cancellation of fundamental currents in the resistors R4, R5, and R6 will occur with a theoretical possible loss reduction of 50%. In this case, referring to FIG. 2 and supposing filter branches 3 of phases a, b, and c are eliminated, then filter branches 1 and 2 of phase a and b respectively are connected to common terminal 4; filter branches 2 and 1 of phases a and c respectively are connected to common terminal 5; and filter branches 1 and 2 of phases b and c respectively are connected to common terminal 6.

Figure 3:
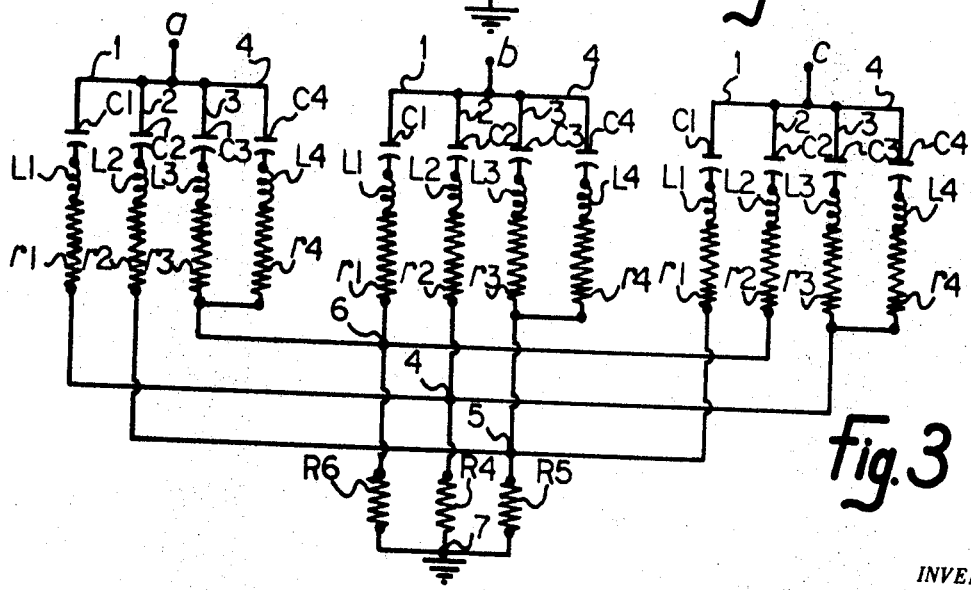
FIG. 3 is a circuit diagram of a three-phase interconnected harmonic filter adapted for the attenuation of four harmonics.

If the number of filter branches per phase is greater than three, then two or more branches are paralleled, such that the ground end terminal of each filter branch is connected to one of the resistors R4, R5 or R6, whereby no two branches tuned to the same frequency terminate on a common node. FIG. 3 shows a filter of this type, in which a fourth filter branch 4, tuned to attenuate another harmonic, is paralleled with the filter branch 3. Any of the resistors $r1$, $r2$, $r3$, and $r4$ may be zero, depending on the harmonic perfomance specification for the filter. In theory, the condition for substantially zero loss in the resistors R4, R5, and R6 is approximately:

$$C_1=C_2=(C_3+C_4)$$

It should be realized that the connection of the resistors R4, R5, and R6, shown in FIGS. 2 and 3, constitutes a star connection wherein the common node 7 can be grounded or ungrounded.

The interconnection of filter branches of different phases causes cancellation of fundamental currents and inherently lower power loss than a conventional filter with substantially the same harmonic performance.

The interconnected filter can be connected either directly to the phases of a three-phase A.C. system, through a transformer winding, or the A.C. terminals of the converter of a high voltage direct current transmission system.

The inductors and capacitors of the interconnected harmonic filter may be either of the tunable or fixed type.

What I claim is:

1. A harmonic filter for a multi-phase electric line, comprising one bank of tuned filter branches provided for each of the phases, the filter branches of each bank being tuned to the same group of different harmonics, and as many resistors as there are phases, each connected intermediate a common star-point and differently tuned filter branches of different banks.

2. A harmonic filter as claimed in claim 1, wherein the number of filter branches per bank is at least equal to the number of banks and wherein each resistor is connected to filter branches of each of the banks.

3. A harmonic filter as claimed in claim 2, wherein the electric line is a three-phase line.

4. A harmonic filter as claimed in claim 2, wherein the number of filter branches per bank is more than the number of banks and differently tuned filter branches in each bank are paralleled to provide in each bank only as many distinct connections as there are banks for the connection of the filter branches to the resistors.

5. A harmonic filter as claimed in claim 4, wherein the electric line is a three-phase line.

6. An interconnected harmonic filter as claimed in claim 4, wherein said capacitor and inductor in the filter branches are variable to adjust the tuning of the latter.

7. A harmonic filter as claimed in claim 1, wherein the electric line is a three-phase line.

8. A harmonic filter as claimed in claim 1, wherein said star-point is grounded.

9. An interconnected harmonic filter as claimed in claim 1, wherein said common star-point is grounded.

10. An interconnected harmonic filter as claimed in claim 1, wherein each filter branch comprises an inductor and a capacitor connected in series.

11. An interconnected harmonic filter for a multi-phase electric line, comprising one bank of tuned filter branches provided for each of the phases, the filter branches of each bank being tuned to the same group of different harmonics, and as many resistors as there are phases, connected to said tuned filter branches and to a common star-point, such that there is connected to each resistor one tuned filter branch for every harmonic of said group of different harmonics, including at least one filter branch from each bank of tuned filter branches.

12. An interconnected harmonic filter for a three-phase electric transmission line comprising one bank of tuned filter branches provided for each of the three phases, the filter branches of each bank being tuned to the same group of different harmonics, and three resistors connected intermediate a common star-point and the tuned filter branches, such that there is connected to each resistor one tuned filter branch for every harmonic of said group of different harmonics, including one filter branch from each bank of tuned filter branches.

13. An interconnected harmonic filter as claimed in claim 12, wherein there are more than three tuned filter branches in each bank and different filter branches from each bank are paralleled to provide in each bank only three distinct connections for the connection of the filter branches to the three resistors.

References Cited

UNITED STATES PATENTS

| | | | |
|---|---|---|---|
| 2,241,831 | 5/1941 | Wahlquist | 307—105 |
| 2,157,886 | 5/1939 | Cuttino | 307—105 |
| 3,290,578 | 12/1966 | Ainsworth | 321—9 |
| 3,395,327 | 7/1968 | Kaiser et al. | 307—105 X |

ROBERT K. SCHAEFER, Primary Examiner

T. B. JOIKE, Assistant Examiner

U.S. Cl. X.R.

321—9; 333—76